United States Patent
Flatt

(10) Patent No.: US 6,549,011 B2
(45) Date of Patent: Apr. 15, 2003

(54) CONDUCTOR TRACING SYSTEM

(75) Inventor: David William Flatt, Gower (GB)

(73) Assignee: Radiodetection Limited ( * ) Notice: Subject to any disclaimer, the term of this patent is extended or adjusted under 35 U.S.C. 154(b) by 0 days.

(21) Appl. No.: 10/015,361

(22) Filed: Dec. 12, 2001

(65) Prior Publication Data
US 2002/0075002 A1 Jun. 20, 2002

Related U.S. Application Data
(60) Provisional application No. 60/268,583, filed on Feb. 14, 2001.

(30) Foreign Application Priority Data
Dec. 20, 2000 (GB) .............................................. 0031092

(51) Int. Cl.[7] .............................. G01V 3/08; G01V 3/10
(52) U.S. Cl. ......................................... 324/326; 324/66
(58) Field of Search ................................. 324/326, 233, 324/66, 67, 232, 327, 328, 329, 335; 455/101, 103, 193

(56) References Cited

U.S. PATENT DOCUMENTS
| | | | |
|---|---|---|---|
| 5,260,059 A | 11/1993 | Acott et al. | |
| 5,260,659 A | * 11/1993 | Flowerdew et al. | 324/326 |
| 5,361,029 A | * 11/1994 | Rider et al. | 324/326 |
| 5,798,644 A | 8/1998 | Eslambolchi et al. | |
| 6,411,073 B1 | 5/2002 | Fischer et al. | 324/66 |

FOREIGN PATENT DOCUMENTS
| | | |
|---|---|---|
| EP | 0825456 A3 | 8/1997 |
| EP | 0825456 A2 | 8/1997 |
| WO | 88/08991 A1 | 5/1988 |

* cited by examiner

Primary Examiner—Edward Lefkowitz
Assistant Examiner—Subhash Zaveri
(74) Attorney, Agent, or Firm—Baker & Hostetler LLP

(57) ABSTRACT

A system for tracing routes of conductors has a transmitter (10) for applying an alternating signal (11) to the conductor to be traced (12), and the field produced by this signal is detected remotely from the conductor. In order to distinguish between the field produced by the conductor being traced and the fields produced by nearby conductors (14) due to capacitive coupling (17), the alternating signal has phase-locked first and second components with frequencies $F_1$ and $F_2$ respectively, related by $N \times F_1 = M \times F_2$, where N and M are non-adjacent integers greater than 1, one of which is odd and one of which is even, having no common factors. The field is detected at a plurality of positions. The phase relationship of the detected signals is investigated to determine unambiguously the position of the object concerned.

7 Claims, 6 Drawing Sheets

CONDUCTOR TRACING SYSTEM

CROSS REFERENCE TO RELATED APPLICATIONS

This application claims the priority of GB 0031092.0 filed on Dec. 20, 2000 and U.S. Provisional Application No. 60/268,583 filed on Feb. 14, 2001 and entitled "Conductor Tracing System" by David William Flatt, the entire contents and substance of which are hereby incorporated in total by reference.

BACKGROUND OF THE INVENTION

1. Field of the Invention

The present invention relates to a method of tracing a conductor e.g. the route of pipes and cables; and to an apparatus therefore. By cable we include electric cables, optical fiber cables (where the conductive armouring provides a conductive path). Indeed the invention is applicable to any metallic pipe or duct. It is now well known to induce a signal into a metallic conductor, and to detect the propagation of that signal at a remote point, to detect the conductor's position or faults in the conductor. This technique is particularly, but not exclusively, applicable where the conductor (such as an electric cable) is inaccessible, or hidden e.g. underground.

2. Summary of the Prior Art

Many techniques have been developed for analysing the signals, which propagate down the conductor, and various techniques have been established for remotely detecting those signals. In general, the field produced by the alternating current on the service may be sampled using an aerial placed in the vicinity of the conductor; the relative magnitude of the detected signal at various points conveys information about the conductor's position. One particular configuration uses one or more horizontal coils so that the detected signal is a maximum when the coil is directly above and orthogonal to the conductor. The phase of this signal with respect of the transmitted signal will be constant at a point, the value determined by the electrical properties of the circuit.

However, much of the theory of such detection has been determined on the basis that there is a single conductor. In practice, such conductors are usually in-groups. The problem then is that, although it is possible to ensure that the transmitter induces current only into one conductor, nevertheless there is likely to be capacitative coupling or even direct bonding between the conductors along their length, and therefore currents will also be generated in the other conductors. At first sight, these other currents should be of much lower amplitude, but in fact the detected signal, derived from the magnetic flux seen by the receiving aerial may not differ significantly between one conductor and another. Bearing in mind that the detection of the signal may have to be from a point remote from the conductor, the distance between the detector and the conductor may therefore be a significant factor in the magnitude of the signal detected. For example, if the conductor to which the current is actually applied is somewhat further away from the detector than another conductor to which current has capacitively been transmitted, then the signal from the latter conductor may be of comparable magnitude with that in the conductor to which the current has been applied. As a result, it is impossible to tell the two apart, and thus the measurement is ineffective.

U.S. Pat. No. 5,260,059 (the disclosure of which is incorporated herein by reference) sought to solve this problem by applying a signal current for transmission which comprised at least two components related in frequency and phase. The frequency relation was one based on a direct harmonic, with one component being an integer (normally an even integer) multiple of the other. However, it was also maintained that component may be produced by combining a sub-harmonic of the frequency of the other with that frequency.

When the signal was capacitively transmitted to another conductor, the phase relationship of the two signals was reversed. Therefore, by comparing the phase of the signal determined at one point with the phase of the signal at another point, it became possible to determine the conductor to which the signal had actually been applied. The present invention seeks to develop the ideas of U.S. Pat. No. 5,260,659. A disadvantage of using two components which are harmonics of each other is that such harmonics may occur naturally, in arrangements where the applied signal was only one component and therefore the arrangement of U.S. Pat. No. 5,260,659 is not wholly reliable.

SUMMARY OF THE INVENTION

Therefore, the present invention proposes that the frequencies $F_1$ and $F_2$ of the two components be related by $N \times F_1 = M \times F_2$ where N and M are non-adjacent integers greater than 1, one of which is odd and one of which is even, with N and M having no common factors.

Then, as in U.S. Pat. No. 5,260,659 one of the points at which the signal is determined may be the point of transmission, so that an absolute value is used. Alternatively it was possible to measure at one point along the cable or pipe, and then measure again at a further point, with the first measurement as a reference, the difference in phase between that first point and the second point could be investigated, i.e. it is a relative measurement. The advantage of this is that comparison of the detected signal with the transmitted signal depends on there being negligible phase shift of the signal along the cable. However, particularly at high frequencies, this phase shift may not be negligible due to the resistance and capacitance effects of the pipe or cable, and therefore a relative system must be used.

To investigate the phase relationship, several different analysis methods may be used.

BRIEF DESCRIPTION OF THE DRAWINGS

Embodiments of the present invention will now be described in detail, by way of example, with reference to the accompanying drawings, in which.

DETAILED DESCRIPTION

Figure 1:
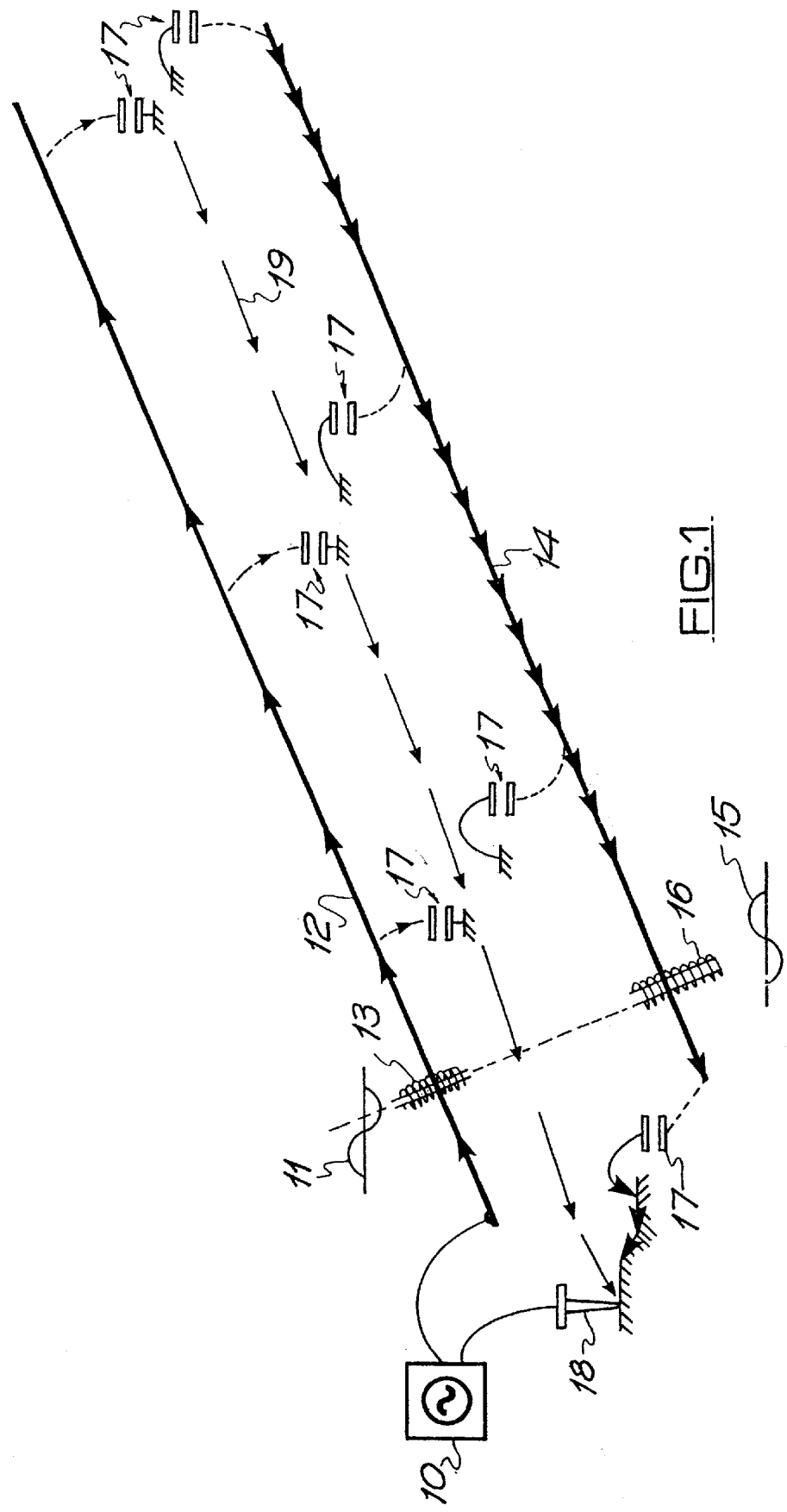
FIG. 1 shows a general schematic view of a cable system.

Referring to FIG. 1, a transmitter 10 applies a waveform 11 to a conductor 12. Although illustrated as a single sine wave, the waveform of the first embodiment of the present invention corresponds to a plurality of waveforms of specific frequency relationship in a predetermined phase. Indeed, at its simplest, it may be treated as a waveform and the first harmonic of that waveform. The signal is propagated down the conductor 12 and may be detected by a suitable detector 13. That detector 13 may operate on standard principles know of detection of signals applied to inaccessible conductors.

However, as described above, the line 12 may be capacitively coupled to another conductor e.g. line 14, and the signal 11 will be transmitted to that line 14. The capacitive couplings are shown at 17. However, as illustrated at 15, the phase is reversed and this means that the signal detected by a detector 16 detecting the signal on line 14 is different from that detected by detector 13. Thus, with a knowledge of the signal phase it becomes possible to tell the line to which the transmitter 10 applies the signal, irrespective of capacitative coupling.

FIG. 1 also shows that the transmitter 10 is connected to an earth stake 18 to provide electrical grounding, and this has the effect of providing a return path indicated by arrows 19 for signals passing via the capacitive couplings 17.

It may also be that the signals are to be connected to a line where there are adjacent lines with alternative signals having similar, though not identical, frequencies. An arrangement for using this embodiment uses frequencies in a fairly narrow band of low frequencies up to around 10 Hz to minimise the coupling of the signals onto adjacent lines. By using frequencies from a set of frequencies that are orthogonal over the period of time that the signal is sampled for, several sets of signals can be transmitted without interfering with each other. For example if 5 Hz and 6 Hz are transmitted on a cable that is close to another cable with 3 Hz and 4 Hz on it and these signals are sampled for 1 second then all these signals are orthogonal over this period of time. Therefore the presence of any of these frequencies will not interfere with the detection of any of the other frequencies in this set. By choosing an appropriate time period a sufficiently large set of discrete frequencies can be found that are orthogonal so that several people can be using the same equipment to locate cables, with different frequency pairs, in the same vicinity without interfering with each others measurements.

In a preferred arrangement of the method of this embodiment, two signals, both phase and frequency locked, are applied simultaneously. The two frequencies are related by $N \times F_1 = M \times F_2$ where N and M are non-adjacent integers greater than 1, one of which is odd and one of which is even, with N and M having no common factors.

At the receiver, multiplying the lower frequency by the higher of the two integers and the higher frequency by the lower of the two integers produces two signals of the same frequency. These two signals produced by frequency multiplying will both have a fixed phase shift with respect to the transmitter, however, one of the signals will have a phase shift which changes by 180° relative to the other when the detector is moved from one line to the other.

Figure 2:
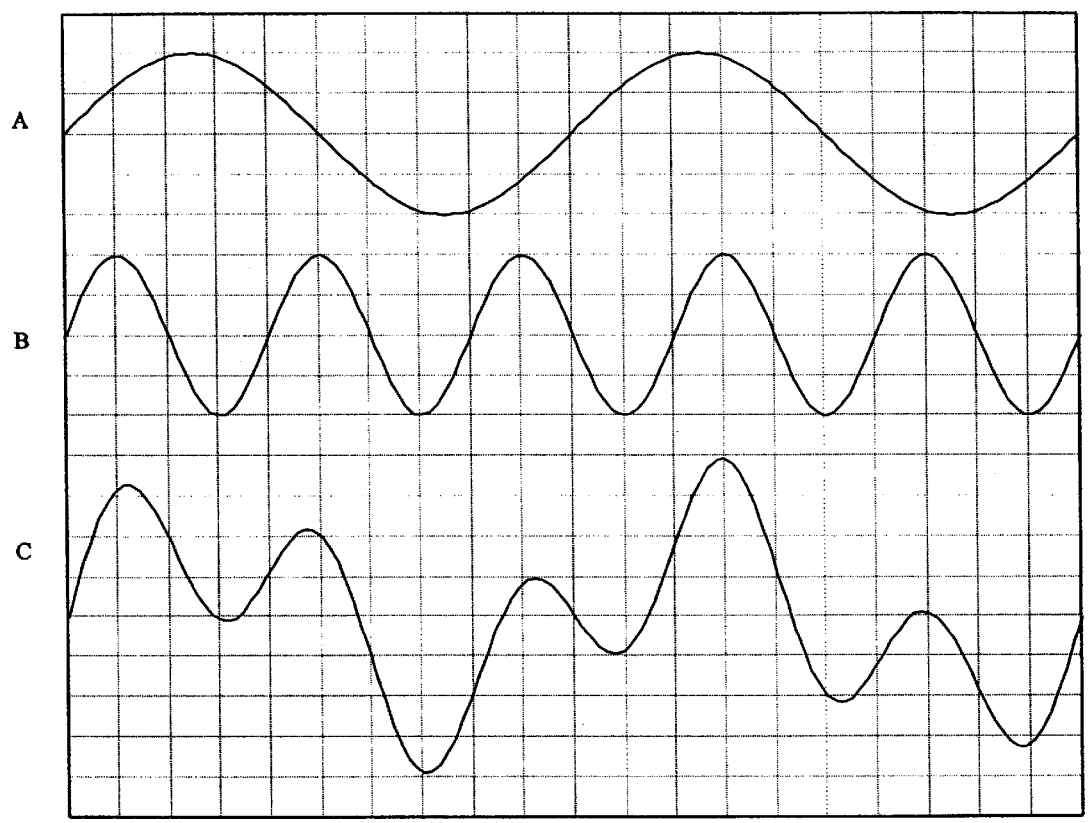
FIG. 2 shows signal at the two frequencies as well as the combined signal.

Thus FIG. 2 shows a first curve A being a first signal generated by the transmitter, 10, at a first frequency and a second curve B being a second signal generated by the transmitter at a second frequency two and a half times the first, which signals are applied to a first conductor (e.g. line 12). These signals, therefore, can be expressed by the equation:

$$5 \times f1 = 2 \times f2.$$

FIG. 2 shows also in curve C the complete transmitted waveform that is the two signals added together.

Figure 3:
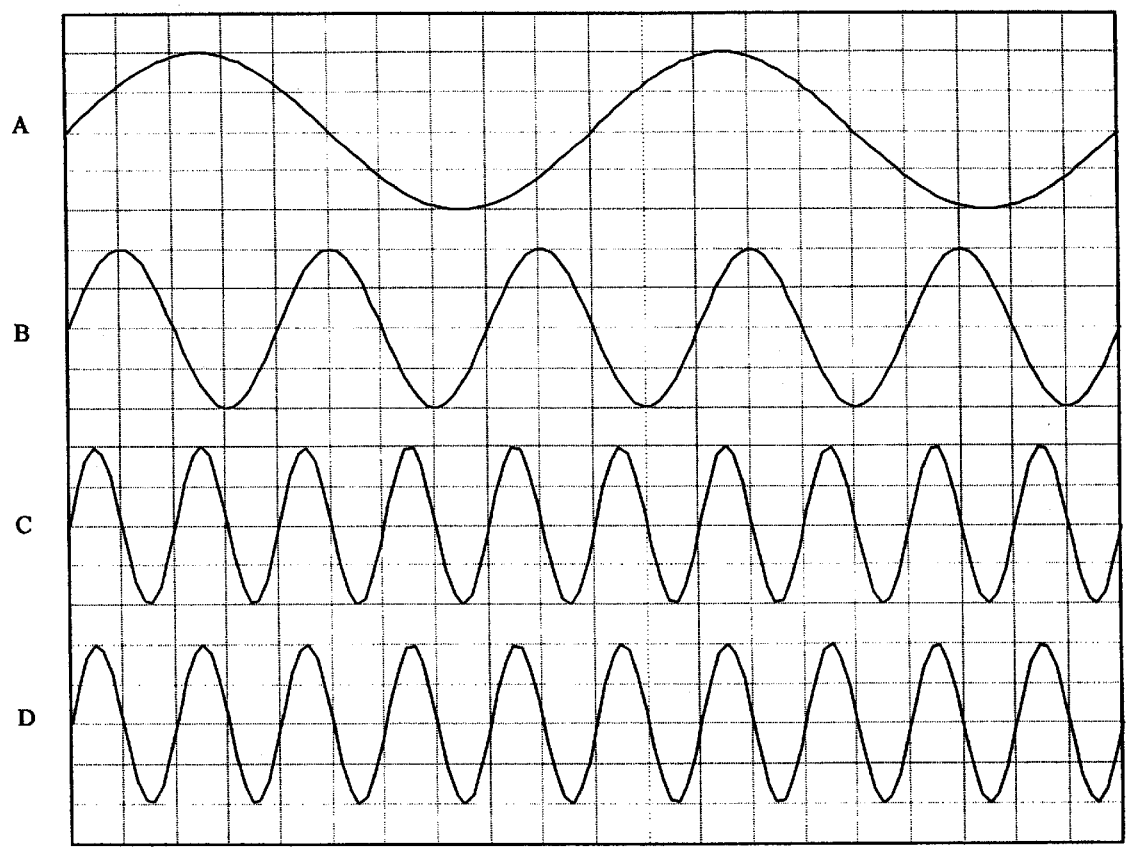
FIGS. 3 and 4 show the signals at stages of the decoding process.
Figure 4:
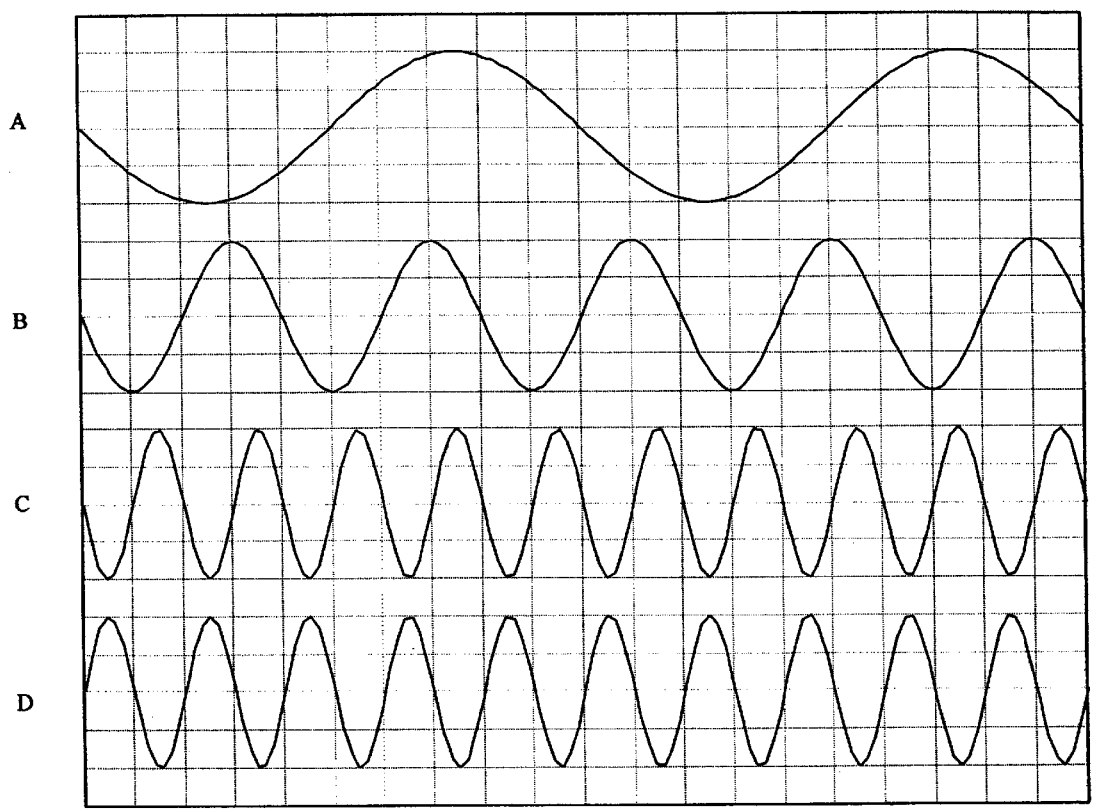

In the receiver these two signals are detected separately and the first waveform, curve A of FIGS. 2 and 3, has its phase multiplied by 5 to produce, curve C of FIG. 3. The second waveform, curve B of FIGS. 2 and 3, has its phase multiplied by 2 to produce, curve D of FIG. 3. These two resulting waveforms are in phase with each other. However, if the fields are detected at a second conductor (e.g. line 14) to which the first is capacitively coupled, the fields from those two signal each change in phase by 180°. This is shown if FIG. 4. Here curve A shows the lower frequency with a phase shift of 180° and curve B shows the higher frequency with a phase shift of 180°. When the lower frequency field signal then has its phase multiplied by 5 (curve C in FIG. 4) and the higher frequency field signal has its phase multiplied by 2 (curve D in FIG. 2), these two resulting signals are now out of phase with each other. Therefore it is possible to determine unambiguously if the field being detected is in the conductor to whom the signals are applied or in another conductor.

In the above description, it is assumed that the signals are transmitted from the end point of the pipe or cable. However, this is not necessary, and it is possible to use a relative system in which a measurement is made at some point along the cable and the phase "zero" of the system set to that point. Then by investigating spaced apart points along the cable or pipe the change in phase can be determined in a similar way to that described above. This is useful where there is a phase change applied to the signal by the line itself.

This principle, applied to pipe and cable surveying techniques provides additional useful information to the operator when resolving the route of a particular conductor in a congested area since with conventional locators, the response over each of the conductors could be identical; using the system of the present invention two distinctly identifiable responses are obtained.

An embodiment of this technique can be used on the equipment that is the subject of U.S. Pat. No. 5,798,644. This equipment is designed for the accurate location of a pipe or cable having a low frequency signal imposed upon it with a transmitting device. As an embodiment of this invention two low frequency signals are imposed having the frequency relationship described in this application. This signal is then detected using the multiplicity of magnetometers described in that equipment and the signals analysed using digital signal processing techniques.

Figure 5:
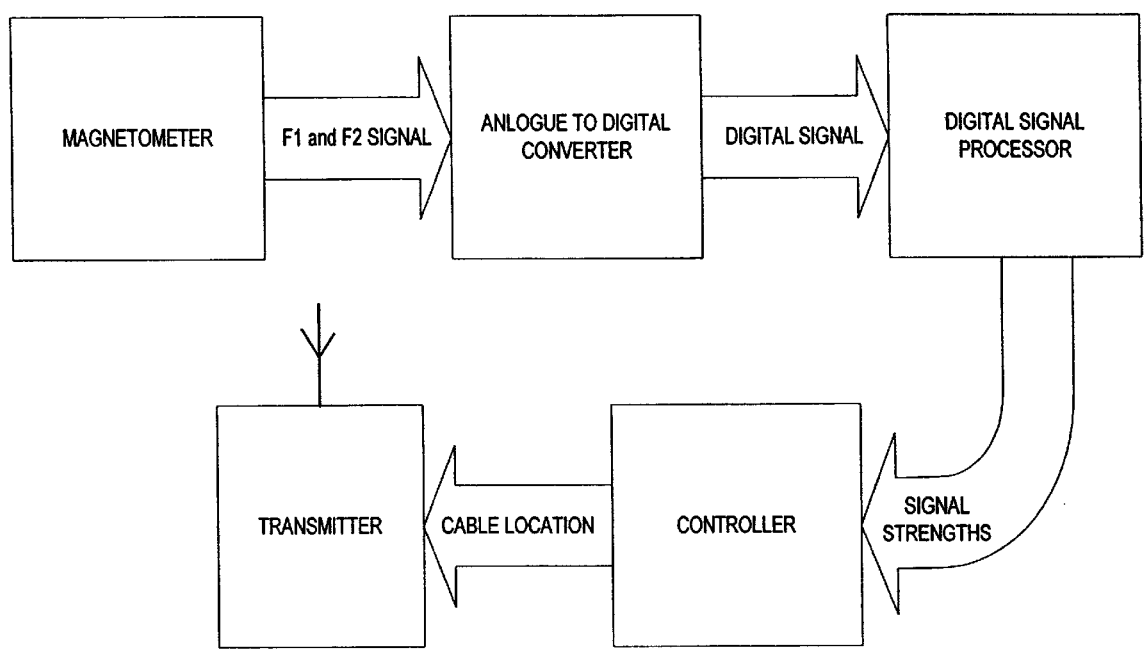
FIG. 5 shows a block diagram of a receiver.

The diagram FIG. 5 shows a block diagram of the equipment. The magnetometers detect the magnetic field due to the current of the cable and convert this to a voltage. This voltage is then fed into the analogue to digital converter to digitise the signal for processing by the Digital Signal Processor (DSP). This analyses the signal and sends a message to the controller detailing the signal strengths. The controller then calculates the position of the cable and transmits the result to the equipment operator.

Figure 6:
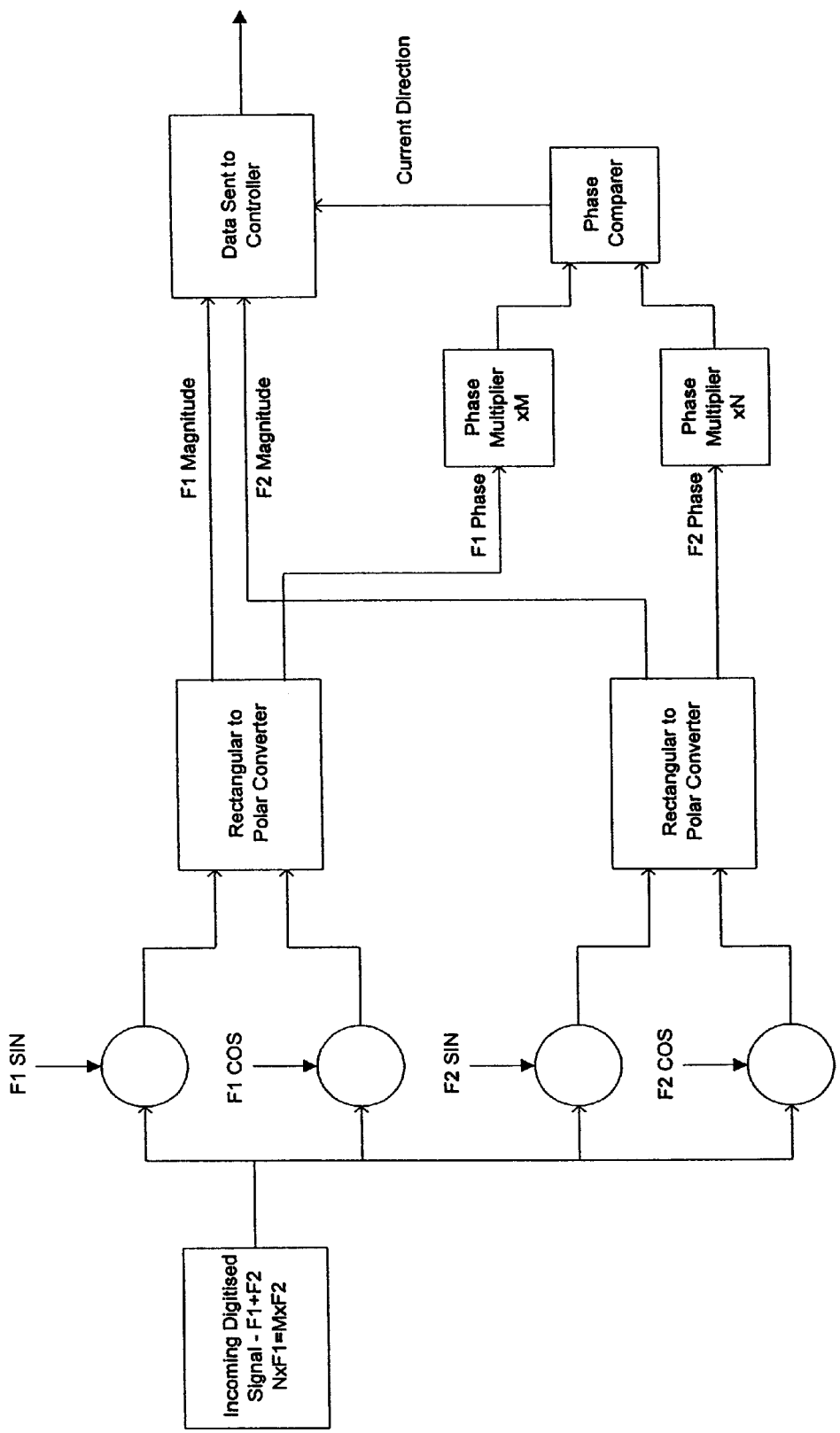
FIG. 6 shows a block diagram of one channel of the detection process in the receiver.

The signal processing that is carried out within the DSP is shown in FIG. 6. The incoming signal is composed of the two frequencies F1 and F2. This signal is then mixed with quadrature signals at the two frequencies and low pass filtered. The resulting signal strengths are analysed to calculate the phase and magnitude of each of the two frequency components. The magnitudes are sent directly to the controller to calculate the cable position, while the phases are multiplied and compared to determine the direction of current flow in the cable.

What is claimed:

1. A method of tracing a conductor, comprising the following:

applying an alternating signal to the conductor at a first point, the alternating signal having first and second continuously present sinusoidal components with frequencies $F_1$ and $F_2$ respectively;

detecting at a second point and at a third point the field produced by the alternating signal on the conductor, the field having first and second continuously present sinusoidal field components with frequencies corresponding to the frequencies of the first and second sinusoidal components of the alternating signal; and determining any change in phase difference of the first and second sinusoidal field components between the second and third points, the determination of a predetermined phase relationship tracing the conductor from the second point to the third point and the determination of a change in said phase relationship indicating a different conductor is being traced from said second point; and, wherein the frequencies $F_1$ and $F_2$ are phase-locked and related by $N \times F_1 = M \times F_2$, where N and M are non-adjacent integers greater than 1, one of which is odd and one of which is even, having no common factors.

2. A method according to claim 1, wherein the first and second points are the same.

3. A method according to claim 1, wherein the second and third points are remote from the first point.

4. A method according to claim 1, wherein the step of determining includes multiplying the first sinusoidal field component by M and the second sinusoidal field component by N.

5. An apparatus for tracing a conductor, comprising:

generation means (10) for applying an alternating signal to a first point on the conductor (12), the alternating signal having first and second continuously present sinusoidal components with frequencies $F_1$ and $F_2$ respectively;

detection means for detecting at a second point and at a third point the field produced by the alternating signal on the conductor, the field having first and second continuously present sinusoidal field components with frequencies corresponding to the frequencies of the first and second sinusoidal components of the alternating signal; and determination means for determining any change in phase difference of the first and second sinusoidal field components between the second and third points, the determination of a predetermined phase relationship tracing the conductor from the second point to the third point and the determination of a change in said phase relationship indicating a different conductor is being traced from said second point;

characterised in that:

the frequencies $F_1$ and $F_2$ are phase-locked and related by $N \times F_1 = M \times F_2$, where N and M are non-adjacent integers greater than 1, one of which is odd and one of which is even, having no common factors.

6. An apparatus according to claim 5, wherein the generation means is arranged to generate the first and second sinusoidal components of the alternating signal.

7. An apparatus according to claim 5, wherein the detection means is arranged to multiply the first sinusoidal field component by M and the second sinusoidal field component by N.

* * * * *